May 17, 1927.
E. A. OFFET
1,628,801
CIRCUIT CLOSER FOR VEHICLE SIGNALS
Filed Oct. 6, 1920
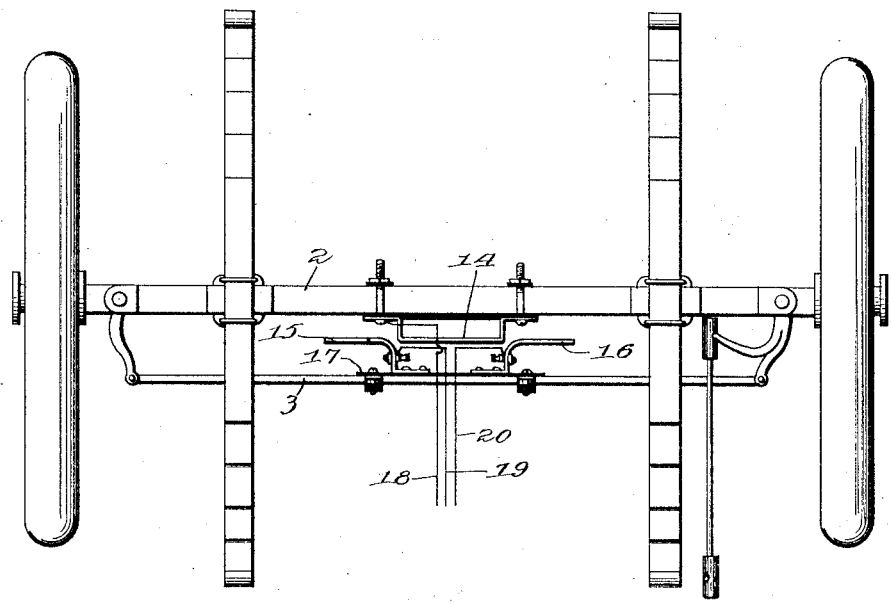
Inventor
Edwin A. Offet.
By Joshua R. H. Potts
Attorney Patented May 17, 1927.

1,628,801

UNITED STATES PATENT OFFICE.

EDWIN ALBERT OFFET, OF TOLEDO, OHIO.

CIRCUIT CLOSER FOR VEHICLE SIGNALS.

Application filed October 6, 1920. Serial No. 415,043.

My invention relates to circuit closers for vehicle signals and particularly for such signaling devices as are adapted to be arranged upon an automobile to indicate changes of direction of the car, to the driver of a following car.

The object of my invention is to provide a device as mentioned which will automatically operate the signal upon turning the car without any attention on the part of the driver. Other objects will appear hereinafter.

My invention will be more readily understood by reference to the accompanying drawings forming a part of this specification and in which,—

The figure is a detail plan view of the steering mechanism of an automobile, illustrating the circuit closures applied thereto.

Referring now to the drawings, 2 indicates the front axle and 3 the usual steering rod of an automobile.

Secured to and insulated from the front axle 2 is a contact member 14, and fixed to the steering rod 3 are contact members 15 and 16 insulated from each other and from the steering rod as indicated at 17. The contact member 14 is connected as by wire 18 to the usual battery or other source of energy, and the contacts 15 and 16 are flexible or yielding members and are connected by the wires 19 and 20 respectively to the respective signals to be operated so that upon turning the car either to the right or left the proper signals are automatically actuated to indicate the direction in which the vehicle is turning. By this arrangement it will be noted that the flexible contacts are always in the path of relative movement of the fixed contact on the axle, so that irrespective of any torsional movement between the axle and the steering rod, the contacts will always engage upon turning the car. This is of particular advantage in traveling over rough and uneven roads where there is frequently a torsional movement between the axle and the steering rod.

I claim:—

In a circuit closer for closing the circuits to directional signals, the combination of the usual axle and steering rod of an automobile, with a fixed contact on said axle and a pair of flexible contacts on the steering rod arranged to selectively and positively engage said fixed contact upon movement of the steering rod, said last mentioned contacts extending forwardly from the steering rod and then bent outwardly in opposite directions and parallel to the rod whereby contact is made upon a predetermined minimum movement of the steering rod and positively maintained irrespective of the amount of movement thereof, substantially as described.

In testimony whereof I have signed my name to this specification.

EDWIN ALBERT OFFET.